United States Patent Office 3,098,087
Patented July 16, 1963

3,098,087
16,21-DIOCYLOXY-Δ⁵-PREGNENE-3OL-20-ONE DERIVATIVES AND PROCESS FOR THE PRODUCTION THEREOF
Albert Wettstein, Basel, Charles Meystre, Arlesheim, and Walter Voser, Binningen, Switzerland, assignors to Ciba Corporation, a corporation of Delaware
No Drawing. Filed Dec. 17, 1956, Ser. No. 628,519
Claims priority, application Switzerland June 12, 1953
4 Claims. (Cl. 260—397.47)

This is a continuation in part of United States applications Serial No. 434,336 filed June 3, 1954, now Patent No. 2,897,219 and Serial No. 434,337 filed June 3, 1954, now abandoned.

This invention relates to 3,16,17-trioxygenated-20-oxopregnenes of the following general formula

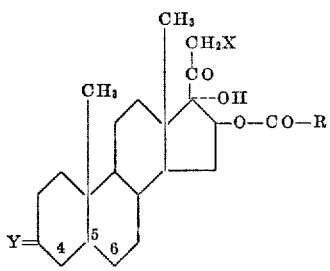

(A)

wherein the oxygen atom attached to carbon atom 16 is in the β-position, wherein R is a hydrogen atom or a lower alkyl radical, X is a hydrogen atom or a lower alkanoyloxy radical, Y an oxo group or the groups

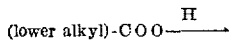

and wherein one of the bonds linking the carbon atom in position 5 to the carbon atoms in positions 4 and 6 is unsaturated.

These compounds are especially valuable because they either exhibit the activity of suprarenal cortex hormones and thus are useful in the treatment of diseases resulting from adrenal cortex insufficiency or can be used as intermediates in the preparation of such hormones. The physiologically active compounds possess the Δ⁴-3-keto grouping and have an acyloxy group in 21-position. The introduction of a 16-oxygen function into the steroid nucleus of the parent Δ⁴-3,20-dioxo-17α-hydroxy-21-acyloxy compound unsubstituted in 16-position changes the known type of action of these compounds on the electrolyte and water excretion in that the behavior in the potassium elimination with increasing dosage is reversed when compared with the 16-unsubstituted compounds. The resulting new type of action is in some respects similar to certain effects of not yet identified fractions from extracts of suprarenal glands.

It has long been recognized that the regulation of the electrolyte and water excretion in the organism is an important factor for the normal function of the living body. Because of their influence on this function and because of their activity in water retention the said 16-oxygenated compounds are also well suited for the treatment in disturbances of metabolism.

The compounds of the present invention which do not possess the Δ⁴-3-keto grouping and an oxygen function in 21-position can be converted into the said physiologically active compounds according to known methods.

The novel compounds are obtained by treating compounds of the formula

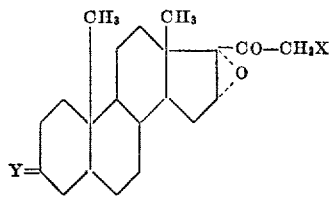

(B)

wherein X and Y have the same meaning as in Formula A and Y may also be the group

and in which one of the bonds linking the 5-carbon atom to the carbon atoms 4 and 6 is unsaturated, with an acid of the structural formula R—COOH in which R represents a lower alkyl radical or a hydrogen atom.

The acylolytic splitting of the 16,17-oxido-pregnenes with a lower aliphatic carboxylic acid is preferably performed in the presence of acidic catalysts such as, for instance concentrated sulfuric acid. The carboxylic acid is thus added to the epoxide with the formation of 17α-hydroxy-16β-lower alkanoyloxy-pregnenes. As lower aliphatic acids there are used for instance acetic, propionic or butyric acid.

The starting materials for the process of this invention can be obtained from compounds of the formula

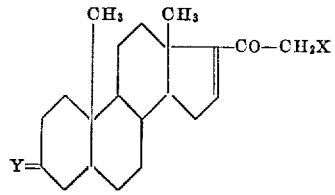

(C)

X and Y having the same meaning as in Formula B and in which there is a double bond in 4,5 or 5,6-position, by treatment with hydrogen peroxide in alkaline solution or with an organic peroxide such as perbenzoic or perphthalic acid.

The 21-unsubstituted 16-oxygenated pregnene compounds can be converted into 21-oxygenated compounds according to the method set forth in co-pending application Serial No. 434,336 by Albert Wettstein et al., filed June 3, 1954. This method consists in treating the 21-desoxy compound with lead tetra-acylates, especially lead tetra-acetate in a suitable solvent, preferably in an aliphatic carboxylic acid corresponding to the acyl residue of the metal acylate employed.

In the starting materials a lower alkanoyloxy radical in 3- or 21-position may be for instance a propionyloxy-, an acetoxy-, a trimethylacetoxy radical or a butyryl-oxy radical.

The conversion of a lower alkanoyloxy radical in 3-position of Δ⁵-3,16β,17α-triacyloxy-pregnene-20-ones into an oxo group may be carried out according to known methods. Thus the 3-acyloxy group may be hydrolysed by the action of alkaline agents. If mild reaction conditions are chosen, hydrolysis of a 21-acyloxy group only may occur simultaneously, whereby there are obtained Δ⁵-3,17α,21-trihydroxy-16β-acyloxy-pregnene-20-ones. After protection of the 21-hydroxyl group by selective esterification and of the 5,6-double bond, for instance by additive combination with halogen the 3-hydroxyl group can be oxidized for instance by treatment with chromic acid in glacial acetic acid or chromium trioxide-pyridine complex. Halogen atoms in positions 5 and 6 may then be eliminated by reduction for instance with zinc and acetic acid or an alcohol or with potassium iodide in acetone.

In the compounds obtained by hydrolysis from the final compounds of the process any free hydroxyl group may be converted to an ester group according to known methods. There are preferably used as esterifying agents derivatives of lower aliphatic acids but also aromatic or aryl-alkyl carboxylic acids, such as for instance cyclohexyl acetic acid.

The products of the process can be isolated and purified in the usual manner, for example, by recrystallization, by chromatography, for example by the fractional elution method, by distribution between non miscible solvents, for example by the countercurrent process or by sublimation.

The following examples illustrate the invention, the parts and percentages being by weight unless otherwise stated and the relationship of parts by weight to parts by volume being the same as that of the gram to the cubic centimeter.

*Example 1*

0.5 part by weight of $\Delta^5$-3$\beta$-acetoxy-16,17$\alpha$-oxido-pregnene-20-one is dissolved in 10 parts by volume of glacial acetic acid and after the addition of 1 part by volume of a mixture of 10 parts by volume of glacial acetic acid and 25 parts by volume of concentrated sulfuric acid, the mixture is allowed to stand for 6 hours at room temperature. The green colored solution is introduced into a separating funnel with 100 parts by volume of ice water and 150 parts by volume of benzene and the aqueous layer separated and extracted again with benzene. The combined benzene solutions are washed with water, sodium bicarbonate solution and water, dried and evaporated. From the crude product resulting (0.53 part by weight) there is obtained by crystallization from methanol or benzene-hexane 0.31 part by weight of $\Delta^5$-3$\beta$,16$\beta$-diacetoxy-pregnene-17$\alpha$-ol-20-one of melting point 169–171° C., $[\alpha]_D^{26} = -38°$ (in chloroform).

The same compound is also obtained from the free $\Delta^5$-16,17$\alpha$-oxido-pregnene-3$\beta$-ol-20-one by treatment for 9 hours with glacial acetic acid-sulfuric acid in the above-described manner, acetylation of the hydroxyl group in 3-position taking place at the same time as the rupture of the epoxide ring.

The hydrolysis of the acetoxy groups can be carried out, for example, as follows:

0.2 part by weight of $\Delta^5$-3$\beta$,16$\beta$-diacetoxy-pregnene-17$\alpha$-ol-20-one is dissolved in 8 parts by volume of dioxane and treated with 0.07 part by weight of potassium hydroxide in 2 parts by volume of water. After standing for 17 hours at room temperature, the clear colorless solution is poured into 80 parts by volume of water. In this way 0.12 part by weight of a crystalline trihydroxy-compound is deposited. The pure substance, after recrystallization from acetone or ethanol, melts at 235–237° C., $[\alpha]_D^{24} = -63°$ (in chloroform).

*Example 2*

3 parts by weight of $\Delta^4$-16,17$\alpha$-oxido-pregnene-3:20-dione are dissolved in 60 parts by volume of glacial acetic acid and treated with 6 parts by volume of a mixture of 10 parts by volume of glacial acetic acid and 2.5 parts by volume of concentrated sulfuric acid. After 8 hours, the solution, which has a strong red fluorescence, is poured into 350 parts by volume of ice water, extracted with benzene and the benzene extracts washed with water, sodium bicarbonate solution and water, dried and evaporated. From the oily yellow residue there are obtained by crystallization from a mixture of benzene and hexane 1.83 parts by weight of crude $\Delta^4$-16$\beta$-acetoxy-pregnene-17$\alpha$-ol-3,20-dione. After recrystallization from benzene-hexane and from acetone, the pure compound is obtained of melting point 183–184° C. $[\alpha]_D^{27} = +101°$ (in chloroform), which exhibits in the ultra-violet spectrum a strong absorption maximum at 242 m$\mu$ ($\epsilon = 16,600$).

For hydrolysis of the acetoxy group, 0.5 part by weight of this compound is dissolved in 15 parts by volume of methanol, treated with a solution of 0.15 part by weight of potassium carbonate in 5 parts by volume of water and the whole allowed to stand for 25 hours at room temperature. After acidification with 0.2 part by volume of glacial acetic acid, the reaction mixture is concentrated to 5–7 parts by volume, treated with 70 parts by volume of water and the precipitate filtered with suction. The resulting crude product is taken up in the moist condition in chloroform, washed with N-sodium carbonate solution and water and dried and evaporated. From the 0.41 part by weight of solid crude product obtained there is produced by recrystallization from a mixture of hexane and acetone a pure dihydroxy compound of melting point 217–219° C., $[\alpha]_D^{24} = +92°$ (in chloroform). The compound exhibits in the ultraviolet spectrum a strong absorption maximum at 239 m$\mu$ ($\epsilon = 16,150$).

*Example 3*

9 parts of $\Delta^4$-21 acetoxy-16,17$\alpha$-oxido-pregnene-3,20-dione melting at 165–167° C. (prepared in known manner from $\Delta^{4:16}$-21-acetoxy-pregnadiene-3,20-dione) are allowed to stand in 180 parts by volume of glacial acetic acid and 25 parts by volume of concentrated sulfuric acid for 10 hours at $+10°$ C. The deep red fluorescing reaction solution is then poured into 2000 parts by volume of water and extracted several times with ether. The combined ethereal solutions are washed with water, dilute sodium bicarbonate solution and water, dried and evaporated. There are obtained 10 parts of a yellow oil, which is dissolved in 100 parts by volume of benzene and chromatographed through a column of 250 parts of aluminum oxide. By elutriation with benzene there are recovered about 3 parts of the starting material. By means of a mixture of equal parts by volume of benzene and ether 3.5 parts of a colorless oil are elutriated, which consists for the greater part of $\Delta^4$-16$\beta$,21-diacetoxy-pregnene-17$\alpha$-ol-3,20-dione. By crystallization from ether the pure substance of melting point 167–168° C., is obtained. It shows an absorption maximum at 241 m$\mu$ ($\epsilon = 17,000$) and a specific rotation of $+99°$ (in chloroform).

2.6 parts of the above oil are dissolved in 6 parts by volume of methanol, and there is added a methylate solution prepared from 0.3 part of sodium and 22 parts by volume of methanol. After 3 minutes 10 parts by volume of a mixture of equal parts by volume of water and methanol are added, and the mixture is acidified after a further 3 minutes with 1 part by volume of glacial acetic acid. The reaction mixture is then evaporated in vacuo to a small volume, mixed with 200 parts by volume of water and extracted with chloroform. After the chloroform extract has been washed with water, sodium bicarbonate solution and water and dried, there is obtained from the extract, after evaporating the solvent, on the addition of acetone 1.86 parts of a crystallizate. By recrystallization from acetone and isopropyl ether, there is obtained a triol melting at 208–212° C.

*Example 4*

0.5 part of $\Delta^5$-3$\beta$,21-diacetoxy-16,17$\alpha$-oxido-pregnene-20-one (prepared in known manner from $\Delta^{5:16}$-3$\beta$,21-diacetoxy-pregnadiene-20-one) melting at 170–173° C. is dissolved in 10 parts by volume of glacial acetic acid, then mixed with 1 part by volume of a mixture of 10 parts by volume of glacial acetic acid and 2.5 parts by volume of concentrated sulfuric acid, and the whole is allowed to stand for 9 hours at room temperature in a well closed vessel. The brown-red solution is then poured into 150 parts by volume of ice water and the resulting precipitate is filtered off with suction after 30 minutes, washed in water and dried over calcium chloride in vacuo.

From the crude product (0.51 part) there is obtained by crystallization from ether 0.3 part of $\Delta^5$-3$\beta$,16$\beta$,21-triacetoxy-pregnene-17α-ol-20-one melting at 181–183° C., and having the specific rotation $[\alpha]_D^{26} = -24°$ (in chloroform). The compound exhibits in the ultraviolet spectrum a distinct maximum ($\epsilon=80$) at 295 mμ.

What is claimed is:

1. A 3,16β,21 - tris - (lower alkanoyloxy) - 17α - hydroxy-5-pregnene-20-one.

2. 3,16β,21 - triacetoxy - 17α - hydroxy - 5 - pregnene-20-one.

3. The process of preparing a 3,16β,21-tris (lower alkanoyloxy) - 17α - hydroxy - 5 - pregnene - 20 - one which comprises the treatment of a 16,17-oxido-3,21-bis (lower alkanoyloxy)-5-pregnene-20-one with a lower alkanoic acid.

4. The process of preparing 3,16β,21-triacetoxy-17α-hydroxy-5-pregnene-20-one which comprises the treatment of 3-21-diacetoxy-16,17-oxido-5-pregnene-20-one with acetic acid.

References Cited in the file of this patent

UNITED STATES PATENTS 2,727,907    Chinn _____ Dec. 20, 1955

UNITED STATES PATENT OFFICE
CERTIFICATE OF CORRECTION

Patent No. 3,098,087                                July 16, 1963

Albert Wettstein et al.

It is hereby certified that error appears in the above numbered patent requiring correction and that the said Letters Patent should read as corrected below.

Column 6, line 6, for "3-21-diacetoxy" read -- 3,21-diacetoxy --.

Signed and sealed this 5th day of May 1964.

(SEAL)
Attest:
ERNEST W. SWIDER

Attesting Officer

EDWARD J. BRENNER
Commissioner of Patents